Aug. 9, 1927.
W. L. TRAUTNER
GREASE RETAINER
Filed April 16, 1925
1,638,378
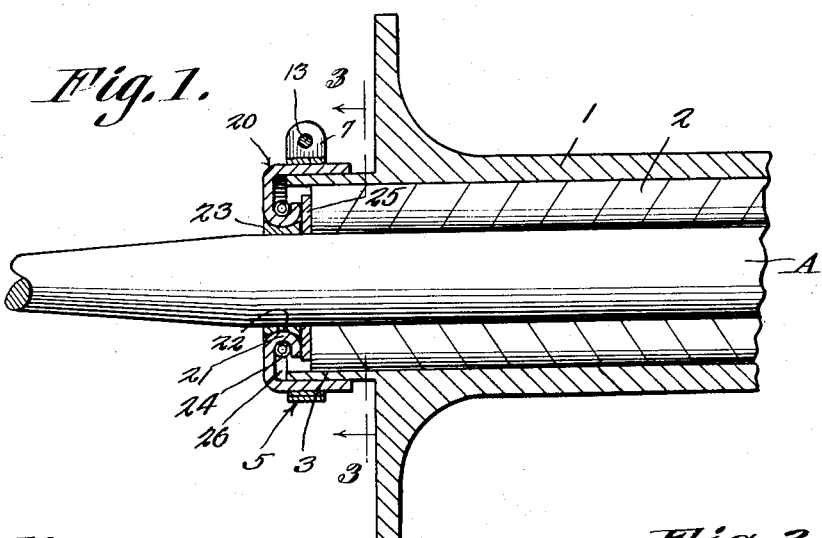
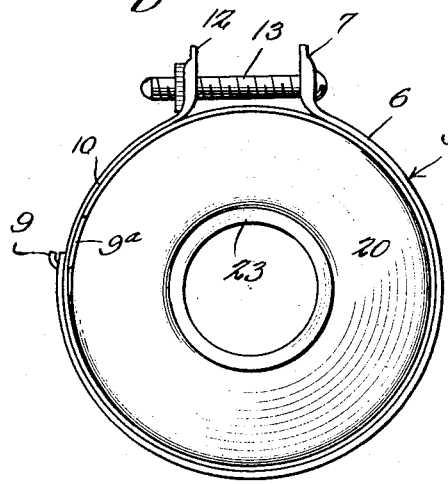
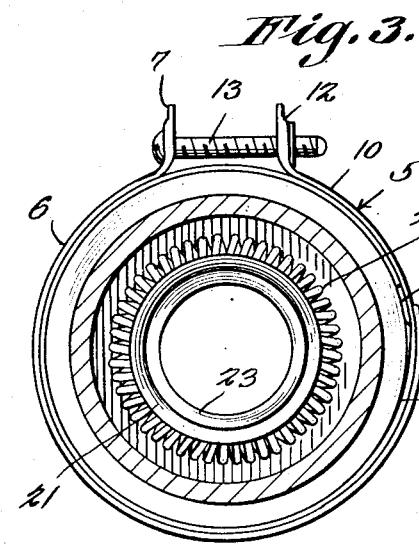
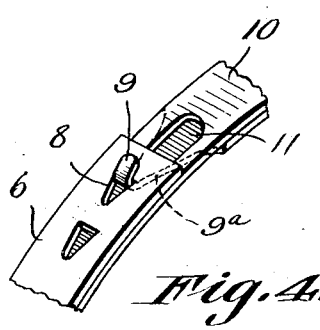
W. L. Trautner
Inventor
By C. A. Snow & Co.
Attorneys Patented Aug. 9, 1927.

1,638,378

UNITED STATES PATENT OFFICE.

WILLIAM L. TRAUTNER, OF MILWAUKEE, WISCONSIN.

GREASE RETAINER.

Application filed April 16, 1925. Serial No. 23,597.

This invention relates to grease retainers for vehicle wheel hubs.

The object of the invention is to so construct a retainer of this character that when the rollers and shaft become worn the parts are tightened to provide an oil tight joint at all times.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a longitudinal section of an axle housing with the axle shown in elevation;

Fig. 2 is an end elevation thereof;

Fig. 3 is a transverse section taken on the line 3—3 of Fig. 1; and

Fig. 4 is a detail perspective view showing the means for connecting the clamping band.

In the embodiment illustrated an axle housing 1 is shown equipped with the usual roller bearings 2 on the front ends of which is mounted a cup-shaped heavy leather washer 20 which is secured to the ends of the housing 3 by means of a clamping ring 5. This ring 5 is composed of two metal strips 6 and 10 superposed one on the other and each provided at one end with a laterally extending apertured ear or lug 7 and 12 respectively through which is designed to be passed a tightening bolt 13 equipped with the usual nuts for holding it in adjusted position.

The strips 6 we will term the outer strip is provided at the end opposite that which carries ears 7 with a plurality of longitudinally spaced apertures 8 which are designed to register with a slot 11 formed in strip 10 near the end which carries the lug 12. The end of strip 10 opposite to that which carries lug 12 has a longitudinally extending reduced tongue 9ª, the terminal of which is bent to form a hook 9 which is passed through slot 9ª and one of the apertures 8 in the other strip 6 and thus securely connects the two strips together as is shown clearly in Figs. 2, 3 and 4. After being so arranged with the leather cup 20 between the strip and the housing extension 3 the bolt 13 is tightened up to draw the strips into clamping engagement with these parts and securely connect the leather washer to the housing in oil tight relation.

The inner edge of the cup 20 is shaped as shown in Fig. 1 to form a flange U-shaped in cross section as shown at 21 and which is designed to fit in a seat 22 formed in the outer face of an annular brass bushing or ring 23 which snugly fits around the axle A and with which the flange 21 is secured by means of a tightly coiled spring 24.

A washer 25 is shown arranged between the outer end of the roller-bearing 2 and the hook-shaped flange 21 of the leather cup-shaped washer 20.

A space 26 is left between the end of the housing on the inside of the leather packing cup to accommodate wheels which pull up on the taper of the axle more than others.

The brass ring 23 is fitted tightly on the axle end and the grooved outer face thereof which forms a seat for the hook-shaped portion of the washer or packing cup permits the spring 24 to roll inward without coming off the ring. This groove or seat also takes up any lateral play in the axle shaft and furnishes a wider joint at this point.

In using this improved grease retainer when the shaft and rollers become worn the spring 24 is allowed to roll toward the short flange of the packing cup and said flange may pull up under the spring and provide an oil tight joint at all times.

I claim:—

In combination with a vehicle axle, its housing and bearings supported within the housing, a bushing positioned on the axle and having a groove formed in its periphery, a cup member formed of flexible material fitted over one end of the housing and secured thereto, said cup member having an opening through which the axle and bushing extend, the portion of the cup member about the opening extending inwardly and radially outwardly defining a spring retainer, resting in the groove of the bushing, a washer positioned on the axle and engaging the bearings, said radially extended portion of the cup member contacting with the washer whereby the radially extended portion is held in position, and a coiled spring positioned in the spring retainer for holding the cup member into engagement with the bushing.

In testimony that I claim the foregoing as my own, I have hereto affixed my signature.

WILLIAM L. TRAUTNER.